United States Patent
Wakita et al.

(10) Patent No.: US 7,219,720 B2
(45) Date of Patent: May 22, 2007

(54) FLAT HOLLOW BODY FOR PASSING FLUID THERETHROUGH, HEAT EXCHANGER COMPRISING THE HOLLOW BODY AND PROCESS FOR FABRICATING THE HEAT EXCHANGER

(75) Inventors: Naoshi Wakita, Tochigi (JP); Yoshinori Katada, Tochigi (JP)

(73) Assignee: Showa Denko K.K., Tokyo (JP)

( * ) Notice: Subject to any disclaimer, the term of this patent is extended or adjusted under 35 U.S.C. 154(b) by 52 days.

(21) Appl. No.: 10/531,182

(22) PCT Filed: Oct. 9, 2003

(86) PCT No.: PCT/JP03/12936
§ 371 (c)(1),
(2), (4) Date: Apr. 11, 2005

(87) PCT Pub. No.: WO2004/033978
PCT Pub. Date: Apr. 22, 2004

(65) Prior Publication Data
US 2006/0032251 A1    Feb. 16, 2006

Related U.S. Application Data

(60) Provisional application No. 60/480,745, filed on Jun. 24, 2003.

(30) Foreign Application Priority Data
Oct. 11, 2002   (JP)   ............................. 2002-298591
Feb. 12, 2003   (JP)   ............................. 2003-033057

(51) Int. Cl.
*F28F 3/08*   (2006.01)
(52) U.S. Cl. .................. 165/167; 29/890.039; 165/166
(58) Field of Classification Search ........ 165/165–167; 29/890.039, 890.03
See application file for complete search history.

(56) References Cited

U.S. PATENT DOCUMENTS 4,815,534 A * 3/1989 Fuerschbach ................. 165/67

(Continued)

FOREIGN PATENT DOCUMENTS

JP          3-221789       *    9/1991

(Continued)

*Primary Examiner*—Teresa J. Walberg
(74) *Attorney, Agent, or Firm*—Oblon, Spivak, McClelland, Maier & Neustadt, P.C.

(57) ABSTRACT

A fluid passing flat hollow body 2 comprises an upper and a lower flat plate 15, 16 elongated laterally and spaced apart as positioned one above the other, and a channel forming body 17 interposed between and brazed to the two flat plates 15, 16. The channel forming body 17 comprises two straight side bars 18 extending laterally and arranged between the upper and lower flat plates 15, 16 respectively at front and rear opposite side edges thereof, an intermediate bar 19 extending laterally and disposed between and spaced apart from the two side bars 18, two heat transfer area increasing portions 21 each interconnecting the intermediate bar 19 and each of the side bars 18 integrally therewith and positioned at an intermediate portion of the height of the bars, and end bars 22 extending forwardly or rearwardly inward from right ends of the respective side bars 18 integrally therewith and having respective inner ends butting on and brazed to front and rear opposite side faces of a right end of the intermediate bar 19. The intermediate bar 19 has a left end portion cut out therefrom, the two heat transfer area increasing portions 21 have respective right end portions cut out therefrom, and each of the flat plates 15, 16 has holes 13, 14 formed in a right end portion thereof respectively on front and rear opposite sides of the intermediate bar 19. Each of the two flat plates 15, 16 is bent at a left end portion thereof toward the other flat plate, and the bent portions 15a, 16a are lapped over and brazed to each other.

17 Claims, 11 Drawing Sheets

U.S. PATENT DOCUMENTS

| | | | |
|---|---|---|---|
| 5,930,894 A * | 8/1999 | Oikawa et al. | 29/890.047 |
| 6,305,463 B1 * | 10/2001 | Salmonson | 165/80.3 |
| 6,340,053 B1 * | 1/2002 | Wu et al. | 165/167 |
| 2002/0079093 A1 * | 6/2002 | Rong | 165/153 |

FOREIGN PATENT DOCUMENTS

| | | |
|---|---|---|
| JP | 9-89477 | 4/1997 |
| JP | 2001-280883 | 10/2001 |
| WO | 98/25093 | 6/1998 |
| WO | 02/63223 | 8/2002 |

* cited by examiner

FLAT HOLLOW BODY FOR PASSING FLUID THERETHROUGH, HEAT EXCHANGER COMPRISING THE HOLLOW BODY AND PROCESS FOR FABRICATING THE HEAT EXCHANGER

CROSS REFERENCE TO RELATED APPLICATIONS

This application is an application filed under 35 U.S.C. §111(a) claiming the benefit pursuant to 35 U.S.C. §119(e)(1) of the filing data of Provisional Application No. 60/480,745 filed Jun. 24, 2003 pursuant to 35 U.S.C. §111(b).

TECHNICAL FIELD

The present invention relates to flat hollow bodies for passing a fluid therethrough, heat exchangers comprising such hollow bodies for use as oil coolers, aftercoolers and radiators and the like for industrial machines such as compressors, machine tools and hydraulic machines, and a process for fabricating the heat exchangers.

The upper and lower sides of FIG. 1 and the left-hand side and right-hand side thereof will herein be referred to as "upper," "lower," "left" and "right," respectively. The term "front" refers to the downstream side in the direction of flow of a low-temperature fluid flowing between each adjacent pair of flat hollow bodies and subjected to heat exchange with a high-temperature fluid flowing through the hollow bodies, namely, to the direction indicated by arrows X in FIG. 1, and FIGS. 10 to 12, and the term "rear" to the opposite direction. These terms "upper," "lower," "left," "right," "front" and "rear" are defined for the sake of convenience; each of the these pairs of terms, "upper" and "lower," "left" and "right," and "front" and "rear" may be so used that the former is replaced by the latter to mean the opposite. Further the term "aluminum" to be used hereinafter includes aluminum alloys in addition to pure aluminum.

BACKGROUND ART

Heat exchangers already known for use in industrial machines such as oil cooler, aftercoolers and radiators include those comprising fluid passing hollow portions of aluminum extending laterally and arranged one above another in parallel at a spacing, aluminum spacers arranged between each pair of adjacent fluid passing portions at the left and right ends thereof and brazed to the fluid passing portions, and a corrugated aluminum fin provided between and brazed to each pair of adjacent fluid passing portions and positioned between the left and right spacers, each of the fluid passing portions comprising a flat hollow body having an upper and a lower flat wall and a peripheral wall interconnecting the upper and lower walls along peripheral edges thereof, each of the upper and lower walls of the flat hollow body having a hole formed in each of left and right end portions thereof, each of the left and right spacers having a through hole communicating with the corresponding holes in the upper and lower walls of the flat hollow body, a pair of left and right headers extending vertically and each provided by all the spacers at each of the left and right ends of the heat exchanger and the portions of the hollow flat bodies positioned between the spacers at the exchanger end (see the publications of JP-A No. 2001-82891 and JP-A No. 1996-233476).

The flat hollow body comprises two flat plates arranged one above the other at a spacing and each made of an aluminum brazing sheet having a brazing material layer over opposite surfaces thereof, and a channel forming body of aluminum disposed between and brazed to the flat plates, each of the flat plates having a hole formed in each of left and right opposite end portions thereof, the channel forming body comprising a peripheral wall interconnecting the peripheral edges of the two flat plates and a heat transfer area increasing portion interconnecting lengthwise intermediate parts of two straight portions of the peripheral wall which are positioned respectively along the front and rear opposite side edges of the flat plates. The two flat plates serve as the upper and lower walls of the flat hollow body, and the peripheral wall of the channel forming body serves as the peripheral wall of the flat hollow body.

However, the conventional heat exchanger has the following problems. Since each pair of adjacent flat hollow bodies have spacers therebetween respectively at the left and right opposite ends thereof, the exchanger has relatively great weight in its entirety. Stated more specifically, the spacer needs to be provided with a through hole for passing therethrough a high-temperature fluid having a high pressure, so that the spacer peripheral wall defining the hole must have an increased thickness, consequently increasing the weight of the spacer and therefore the weight of the overall heat exchanger.

Since the through hole is formed in each spacer, it is impossible to form screw holes in the spacer for use in attaching a bracket or boss to the spacer. The bracket or boss accordingly needs to be fixed in position by welding through a cumbersome procedure. Although the spacer peripheral wall defining the through hole must be given an increased thickness if screw holes are to be formed in the spacer for use in attaching the bracket or boss thereto, this results in a further increase in the weight of the entire heat exchanger.

Because the heat exchanger has the headers at the respective left and right ends thereof, the area of the unit wherein the high-temperature fluid and the low-temperature fluid are subjected to heat exchange, namely, the area of the core unit, is small relative to the overall size of the heat exchanger required for the installation of the exchanger. This imposes limitations on the effect to improve the heat exchange efficiency.

The high-temperature fluid flows into one of the headers and thereafter flows through the flat hollow bodies into the other header. In the meantime, the high-temperature fluid is subjected to heat exchange with the low-temperature fluid flowing forward from the rear between the pairs of adjacent hollow bodes. In this case, the portion of high-temperature fluid flowing in the rear side portions of the hollow bodies is efficiently cooled with the low-temperature fluid, whereas the low-temperature fluid reaching the front side portions of the hollow bodies is already given a relatively high temperature and therefore less efficiently cools the high-temperature fluid flowing through the front side portions of the hollow bodies. Consequently, the heat exchanger is not fully satisfactory in overall heat exchange efficiency.

An object of the present invention is to overcome the above problems and to provide a fluid passing flat hollow body which is usable for a heat exchanger which is smaller in weight and higher in heat exchange efficiency than the conventional heat exchanger, a heat exchanger comprising such fluid passing flat hollow bodies, and a process for fabricating the heat exchanger.

DISCLOSURE OF THE INVENTION

The present invention provides a first fluid passing flat hollow body comprising an upper and a lower flat plate elongated laterally, a peripheral wall interconnecting peripheral edges of the upper and lower walls, and a partition wall dividing the interior of the wall into front and rear two channels extending laterally, each of the upper and lower walls having two holes formed in a right end portion thereof respectively on front and rear opposite sides of the partition wall and spaced apart transversely of the upper or lower wall for causing the respective channels to communicate with the outside therethrough, a left end portion of the partition wall being cut out to hold the two channels in communication with each other.

When first fluid passing flat hollow bodies are used for a heat exchanger, a fluid of high temperature is cooled to some extent with a fluid of low temperature while flowing through the front channels of the flat hollow bodies and is then admitted into the rear channels, and the fluid of low temperature is heated to some extent in rear-side portions of clearances between the adjacent hollow bodies and thereafter reaches front-side portions of the clearances. Accordingly, even if the fluid of low temperature reaching the front-side portions of the clearances has a relatively high temperature, the high-temperature fluid flowing in the front channels still has a high temperature, differs greatly from the low-temperature fluid in temperature and is therefore efficiently cooled. Even if the high-temperature fluid flowing in the rear channels has its temperature reduced relatively greatly, the low-temperature fluid in the front-side portions of the clearances still has a low temperature, differs greatly from the high-temperature fluid in temperature and therefore efficiently cools the high-temperature fluid. As a result, the device achieves a high heat exchange efficiency.

The present invention provides a second fluid passing flat hollow body which comprises a first flat hollow body. The second flat hollow body comprises an upper and a lower flat plate elongated laterally and spaced apart as positioned one above the other, and a channel forming body interposed between and brazed to the two flat plates, the channel forming body comprising two straight side bars extending laterally and arranged between the upper and lower flat plates respectively at front and rear opposite side edges thereof, an intermediate bar extending laterally and disposed between and spaced apart from the two side bars, two heat transfer area increasing portions each interconnecting the intermediate bar and each of the side bars integrally therewith and positioned at an intermediate portion of the height of the bars, and end bars extending forwardly or rearwardly inward from right ends of the respective side bars integrally therewith and having respective inner ends butting on and brazed to front and rear opposite side faces of a right end of the intermediate bar, the intermediate bar having a left end portion cut out therefrom, the two heat transfer area increasing portions having respective right end portions cut out therefrom, each of the upper and lower flat plates having holes formed in a right end portion thereof respectively on front and rear opposite sides of the intermediate bar, the upper and lower flat plates providing the respective upper and lower walls, a left end portion of each of the upper and lower two flat plates being bent toward the other flat plate, with the bent portions lapped over and brazed to each other, to thereby provide a left wall portion of the peripheral wall, the side bars of the channel forming body providing respective front and rear opposite side wall portions of the peripheral wall, the end bars of the channel forming body providing a right wall portion of the peripheral wall. When this flat hollow body is used to provide a heat exchanger, the hollow body exhibits the same advantage as the flat hollow body of the invention already described. Since the outer ends of the end bars of the channel forming body are brazed to the intermediate bar, the flat hollow body is given an enhanced strength. Stated more specifically, the right end of the intermediate bar of the channel forming body is brazed to the portion of the spacer between the two through holes therein, and the outer ends of the end bars are brazed to this intermediate bar. Accordingly, even if the end bars are subjected to a force acting rightward by the fluid flowing through the flat hollow body, the end bars are prevented from being damaged or broken.

The present invention provides a third fluid passing flat hollow body which comprises a second flat hollow body described wherein each of the upper and lower flat plates is made of an aluminum brazing sheet, and the channel forming body is made of an aluminum extrudate. The flat hollow body can then be further reduced in weight and becomes easy to fabricate.

The present invention provides a fourth fluid passing flat hollow body which comprises a second flat hollow body described wherein one of the left-end bent portions of the upper and lower flat plates which is positioned inside has a part corresponding to each of side bars of the channel forming body, the side bar corresponding part having on an inner side thereof a radius of curvature permitting no clearance to be created between the side bar corresponding part and the side bar, the other bent portion which is positioned outside having a part corresponding to each side bar of the channel forming body, the second-mentioned side bar corresponding part having on an inner side thereof a radius of curvature permitting no clearance to be created between the second-mentioned side bar corresponding part and the side bar, and the part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof.

The present invention provides a fifth fluid passing flat hollow body which comprises a fourth flat hollow body described wherein the side bar corresponding parts of the left-end bent portions of the upper and lower flat plates are up to 0.2 mm in radius of curvature on the inner side thereof, and the parts of the left-end bent portions of the upper and lower flat plates other than the side bar corresponding parts thereof have on the inner side thereof a radius of curvature not smaller than the thickness of the upper and lower flat plates.

With the fourth and fifth flat hollow bodies, the left-end bent portion of the upper or lower flat plate which is positioned inside has a part corresponding to each of side bars of the channel forming body, and the side bar corresponding part has on an inner side thereof a radius of curvature permitting no clearance to be created between the side bar corresponding part and the side bar, e.g., a radius of curvature of up to 0.2 mm. The other bent portion which is positioned outside has a part corresponding to each side bar of the channel forming body, and this side bar corresponding part has on an inner side thereof a radius of curvature permitting no clearance to be created between the side bar corresponding parts, e.g., a radius of curvature of up to 0.2 mm. Consequently, the fluid is prevented from leaking from between the side bar corresponding part of the inside bent portion and the side bar, and from between the side bar corresponding parts of bent portions of the upper and lower two flat plates. The part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof, e.g., a radius of curvature not smaller than the thickness of the upper and lower flat plates. Accordingly, the part other than the side bar corresponding parts is prevented from cracking, consequently giving the left wall portion of the flat hollow body increased pressure resistance and improved cyclic proof stress. If the part is equal to the side bar corresponding parts in radius of curvature on the inner side, cracks will develop in the plate, for example, approximately to one half the thickness of the plate from the outer surface when the upper and lower flat plates are bent, impairing the pressure resistance and cyclic proof stress of the left wall portion of the hollow body and entailing the likelihood that the bent portions will crack completely due to long use to permit leakage of the fluid. If the side bar corresponding parts of the left-end bent portion of the upper or lower flat plate which portion is positioned inside and the side bar corresponding parts of the left-end bent portion which is positioned outside are, for example, up to 0.2 mm in radius of curvature on the inner side, cracks will develop in the plate approximately to one half the thickness of the plate from the outer surface when the upper and lower plates are bent, whereas the bent portions are unlikely to crack completely despite a long period of use because the side bar corresponding parts of the inside bent portion are brazed to the side bars, with the side bar corresponding parts of the outside bent portion brazed to the inside bent portion.

The present invention provides a sixth fluid passing flat hollow body which comprises a fourth flat hollow body described wherein the left-end bent portion of the upper or lower flat plate which bent portion is positioned inside has at the part thereof other than the side bar corresponding parts such a height that said part of the bent portion will not interfere with the curved part of the bent portion which is positioned outside. This structure eliminates a clearance to be otherwise created between the bent portions of the two flat plates, consequently precluding the leakage of fluid. If the part of the inside bent portion other than the side bar corresponding parts has such a height as to interfere with the curved part of the outside bent portion, a clearance will occur between the bent portions, and the bent portions will not be brazed, when the upper and lower flat plates are assembled in fabricating the heat exchanger.

The present invention provides a first heat exchanger which comprises fluid passing portions extending laterally and arranged one above another in parallel at a spacing, a spacer disposed between right ends of each pair of adjacent fluid passing portions and brazed to the pair of fluid passing portions, a spacer bar disposed between left ends of each pair of adjacent fluid passing portions and brazed to the pair of fluid passing portions, and a fin provided between and brazed to each pair of adjacent fluid passing portions and positioned between the spacer and the spacer bar, each of the fluid passing portions comprising a first fluid passing flat hollow body described above, the spacer having two through holes communicating respectively with the two holes of each of the upper and lower walls of the flat hollow body.

The present invention provides a second heat exchanger which comprises fluid passing portions extending laterally and arranged one above another in parallel at a spacing, a spacer disposed between right ends of each pair of adjacent fluid passing portions and brazed to the pair of fluid passing portions, a spacer bar disposed between left ends of each pair of adjacent fluid passing portions and brazed to the pair of fluid passing portions, and a fin provided between and brazed to each pair of adjacent fluid passing portions and positioned between the spacer and the spacer bar, each of the fluid passing portions comprising one of second to sixth fluid passing flat hollow bodies described above, the spacer having two through holes communicating respectively with the two holes of each of the upper and lower walls of the flat hollow body.

The two heat exchangers of the present invention have a spacer bar disposed between the left end portions of each pair of adjacent flat hollow bodies and are therefore smaller in weight than the conventional heat exchanger wherein a spacer is disposed at the corresponding location. The spacer bar is provided only for forming an air passing clearance and can accordingly be smaller in size and less heavy than the spacer. This gives smaller weight to the heat exchanger in its entirety than conventionally. Further with the heat exchangers described, screw bores can be formed in the spacer bar for use in attaching a bracket or boss to the spacer bar. The bracket or boss can be fixed in place by facilitated work. Further in the case of the heat exchangers of the invention, the entire exchanger except for the spacers and spacer bars serves to subject a high-temperature fluid and a low-temperature fluid to heat exchange, so that the area of the unit wherein the high-temperature fluid and the low-temperature fluid are subjected to heat exchange, namely, the area of the core unit, is greater than in the conventional heat exchanger, relative to the overall size of the heat exchanger required for the installation of the exchanger to ensure improved heat exchange performance.

With the two heat exchangers described, the spacer may comprise a single member having front and rear two through holes, or front and rear two members each having one through hole.

The two heat exchangers described can be of the following construction.

Each of these heat exchangers is provided at a front upper end portion thereof with a fluid inlet in communication with the front channels of all the flat hollow bodies and with the front through holes of all the spacers, and has a fluid outlet at a rear lower end portion thereof in communication with the rear channels of all the flat hollow bodies and with the rear through holes of all the spacers.

Each heat exchanger has a fluid inlet at a front portion of right wall upper end thereof in communication with the front channels of all the flat hollow bodies and with the front through holes of all the spacers, and a fluid outlet at a rear portion of right wall lower end thereof in communication with the rear channels of all the flat hollow bodies and with the rear through holes of all the spacers.

Each heat exchanger has a fluid inlet at a front portion of top wall right end thereof in communication with the front channels of all the flat hollow bodies and with the front through holes of all the spacers, and a fluid outlet at a rear portion of top wall right end thereof in communication with the rear channels of all the flat hollow bodies and with the rear through holes of all the spacers.

In each heat exchanger, screw bores are formed in the wall of a spacer bar facing toward a direction opposite to the fin.

In each heat exchanger, a screw bore is formed in each of the front and rear end faces of a spacer bar.

In each heat exchanger, a spacer bar is integrally provided with a ridge extending over the entire length thereof and projecting outward beyond flat hollow bodies, and screw bores are formed in least one of the upper and lower faces of the ridge and in at least one of the front and rear end faces thereof.

The present invention provides a process for fabricating a heat exchanger, i.e., a second heat exchanger described above, the process being characterized by:

preparing channel forming body blanks of aluminum extrudates each comprising two straight side bars extending laterally and spaced apart forwardly or rearwardly, an intermediate bar extending laterally and disposed between and spaced apart from the two side bars, and two flat plate portions each interconnecting the intermediate bar and each of the side bars integrally therewith and positioned at an intermediate portion of the height of the bars, pairs of upper and lower flat plates elongated laterally, spacers each having two through holes spaced apart forwardly or rearwardly, and spacer bars, making channel forming bodies each by cutting out left and right end portions of the intermediate bar of the blank, cutting out a right end portion of each of the flat plate portions of the blank over a length equal to the length of the cutout of the right end portion of the intermediate bar, subjecting each flat plate portion of the blank to press work to form a heat transfer area increasing portion, and bending right end portions of the side bars of the blank forwardly or rearwardly inward to cause outer ends thereof to butt on front and rear opposite side faces of the right end of the intermediate bar and to form end bars, bending the flat plates in each pair toward each other at left end portions thereof to form bent portions and forming two holes in a right end portion of each flat plate respectively on front and rear opposite sides of the intermediate bar, arranging a plurality of combinations one above another in parallel at a spacing, each of the combinations comprising the channel forming body interposed between the pair of upper and lower flat plates, providing the spacer between right end portions of each pair of adjacent combinations with the two through holes in communication with the respective two holes of each of the flat plates, providing the spacer bar between left end portions of each pair of adjacent combinations, and further providing a fin between each pair of adjacent combinations, as positioned between the spacer and the spacer bar, and brazing each pair of upper and lower flat plates to the side bars, the intermediate bar and the end bars of the channel forming body between the pair of flat plates, outer ends of the end bars to the intermediate bar, and the bent portions of the pair of flat plates to each other, and further brazing each pair of adjacent flat plates to the spacer, the spacer bar and the fin which are interposed therebetween.

The process of the invention for fabricating the heat exchanger readily provides the second heat exchanger having the foregoing advantages.

In the heat exchanger fabricating process of the present invention, the flat plates are made of an aluminum brazing sheet, the spacers, the spacer bars and channel forming body blanks are made of aluminum extrudates, the fin is made of a thin aluminum plate, and the brazing operation is conducted with a brazing material melting from the flat plates. The flat hollow body can then be further reduced in weight and becomes easy to fabricate.

In the heat exchanger fabricating process of the present invention, one of the left-end bent portions of the upper and lower flat plates which is positioned inside has a part corresponding to each of side bars of the channel forming body, the side bar corresponding part having on an inner side thereof a radius of curvature permitting no clearance to be created between the side bar corresponding part and the side bar, the other bent portion which is positioned outside having a part corresponding to each side bar of the channel forming body, the second-mentioned side bar corresponding part having on an inner side thereof a radius of curvature permitting no clearance to be created between the second-mentioned side bar corresponding part and the side bar, and the part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof. It is then desired that the side bar corresponding parts of the left-end bent portions of the upper and lower flat plates be up to 0.2 mm in radius of curvature on the inner side thereof, and that the parts of the left-end bent portions of the upper and lower flat plates other than the side bar corresponding parts thereof have on the inner side thereof a radius of curvature not smaller than the thickness of the upper and lower flat plates. In these cases, the left-end bent portion of the upper or lower flat plate which is positioned inside has a part corresponding to each of side bars of the channel forming body, and the side bar corresponding part has on an inner side thereof a radius of curvature permitting no clearance to be created between the side bar corresponding part and the side bar, e.g., a radius of curvature of up to 0.2 mm. The other bent portion which is positioned outside has a part corresponding to each side bar of the channel forming body, and this side bar corresponding part has on an inner side thereof a radius of curvature permitting no clearance to be created between the side bar corresponding parts, e.g., a radius of curvature of up to 0.2 mm. Consequently, the fluid is prevented from leaking from between the side bar corresponding part of the inside bent portion and the side bar, and from between the side bar corresponding parts of bent portions of the upper and lower two flat plates. The part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof, e.g., a radius of curvature not smaller than the thickness of the upper and lower flat plates. Accordingly, the part other than the side bar corresponding parts is prevented from cracking, consequently giving the left wall portion of the flat hollow body increased pressure resistance and improved cyclic proof stress.

In the heat exchanger fabricating process of the present invention, the left-end bent portion of the upper or lower flat plate which bent portion is positioned inside may have at the part thereof other than the side bar corresponding parts such a height that said part of the bent portion will not interfere with the curved part of the bent portion which is positioned outside. Thus, the part of the inside left-end bent portion of the upper or lower flat plate other than the side bar corresponding parts has a height not permitting this part to interfere with the curved part of the outside bend portion. This eliminates a clearance to be otherwise created between the bent portions of the two flat plates, consequently precluding the leakage of fluid. If the part of the inside bent portion other than the side bar corresponding parts has such a height as to interfere with the curved part of the outside bent portion, a clearance will occur between the bent portions, and the bent portions will not be brazed, when the upper and lower flat plates are assembled in fabricating the heat exchanger.

BEST MODE OF CARRYING OUT THE INVENTION

Embodiments of the invention will be described below with reference to the drawings.

Figure 1:
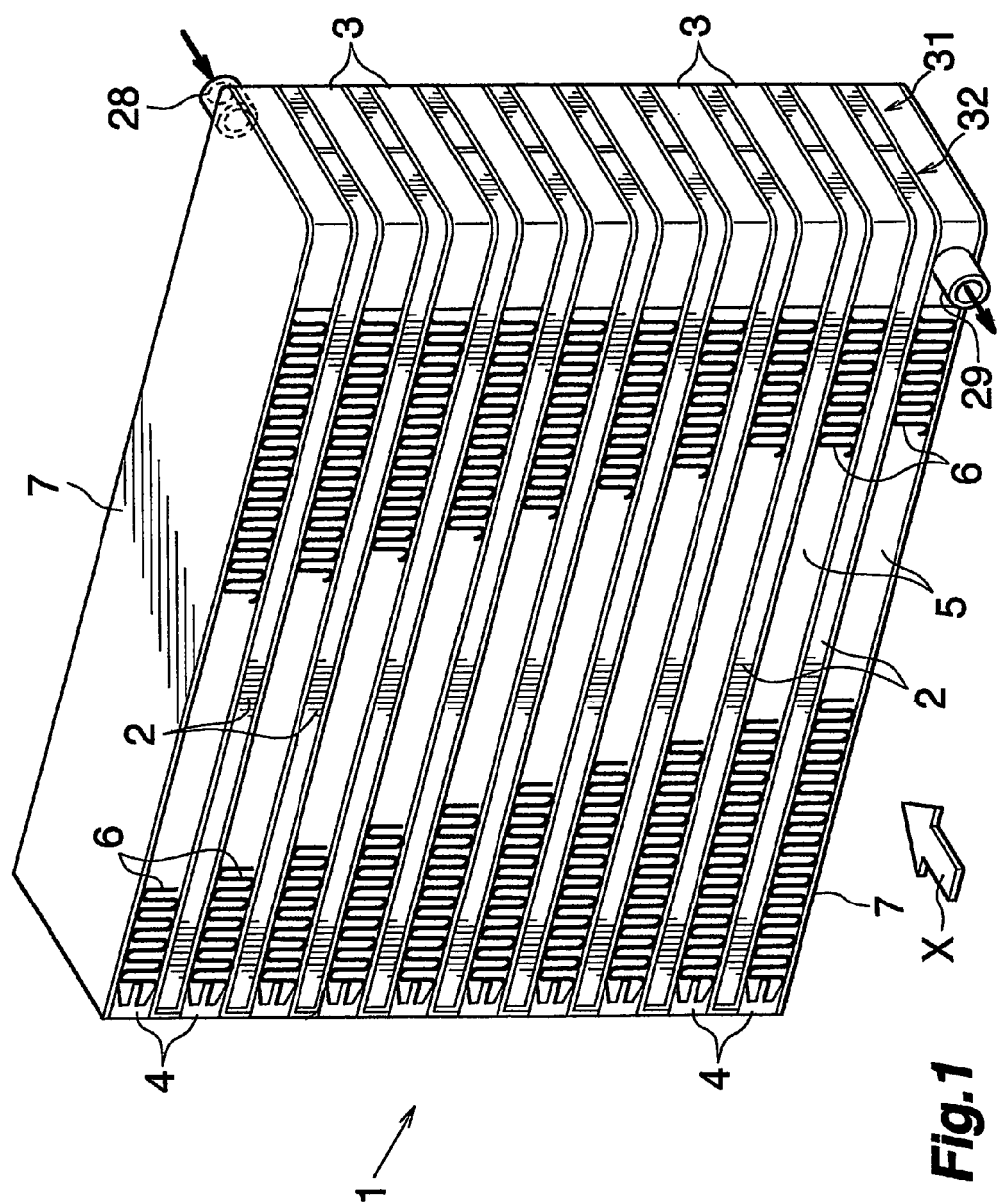
FIG. 1 is a perspective view showing the overall construction of an oil cooler wherein fluid passing flat hollow bodies of the invention are used.
Figure 8:
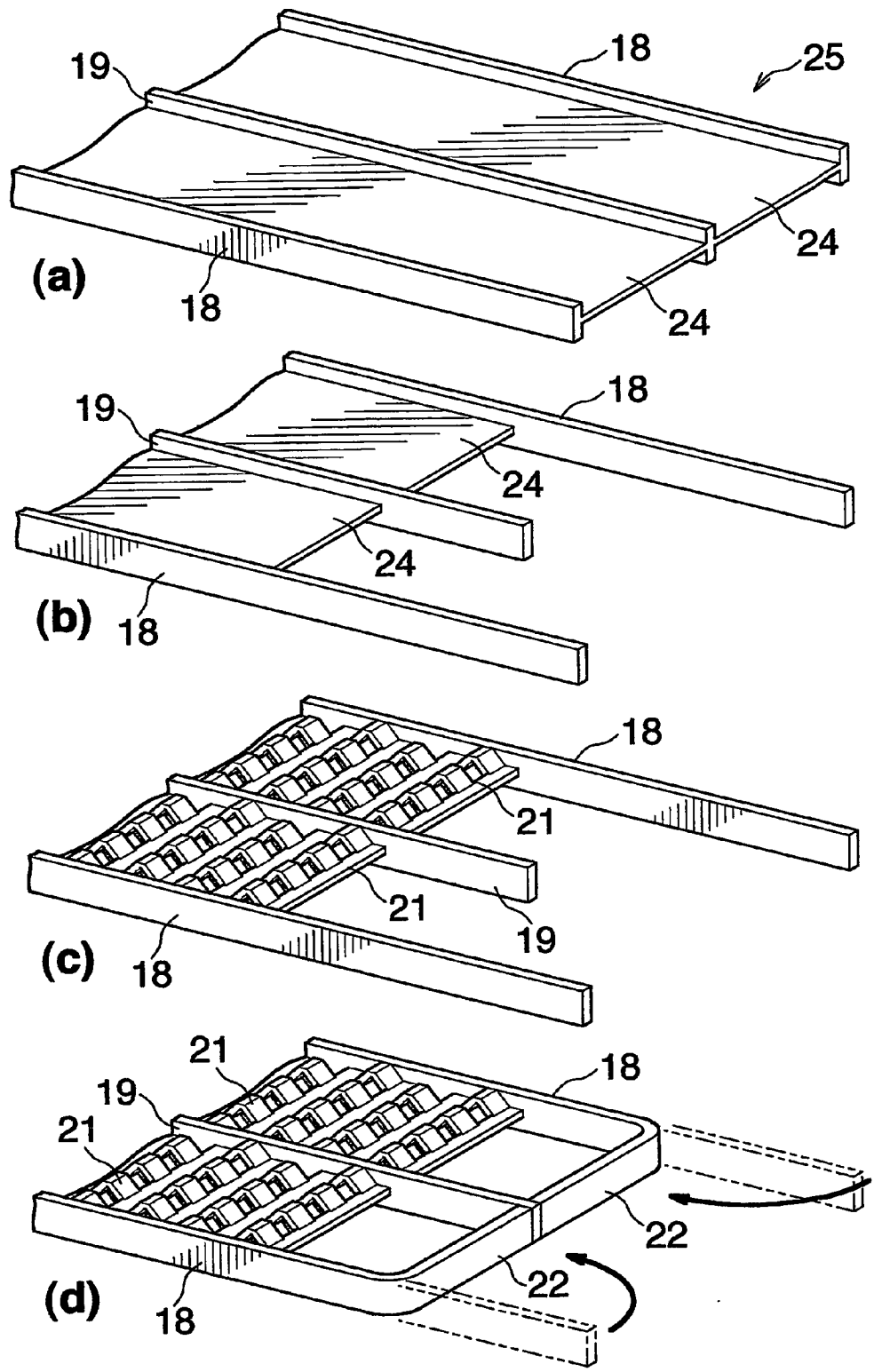
FIG. 8 includes fragmentary perspective views of a right end portion of the channel forming body to show a process for fabricating the body.
Figure 9:
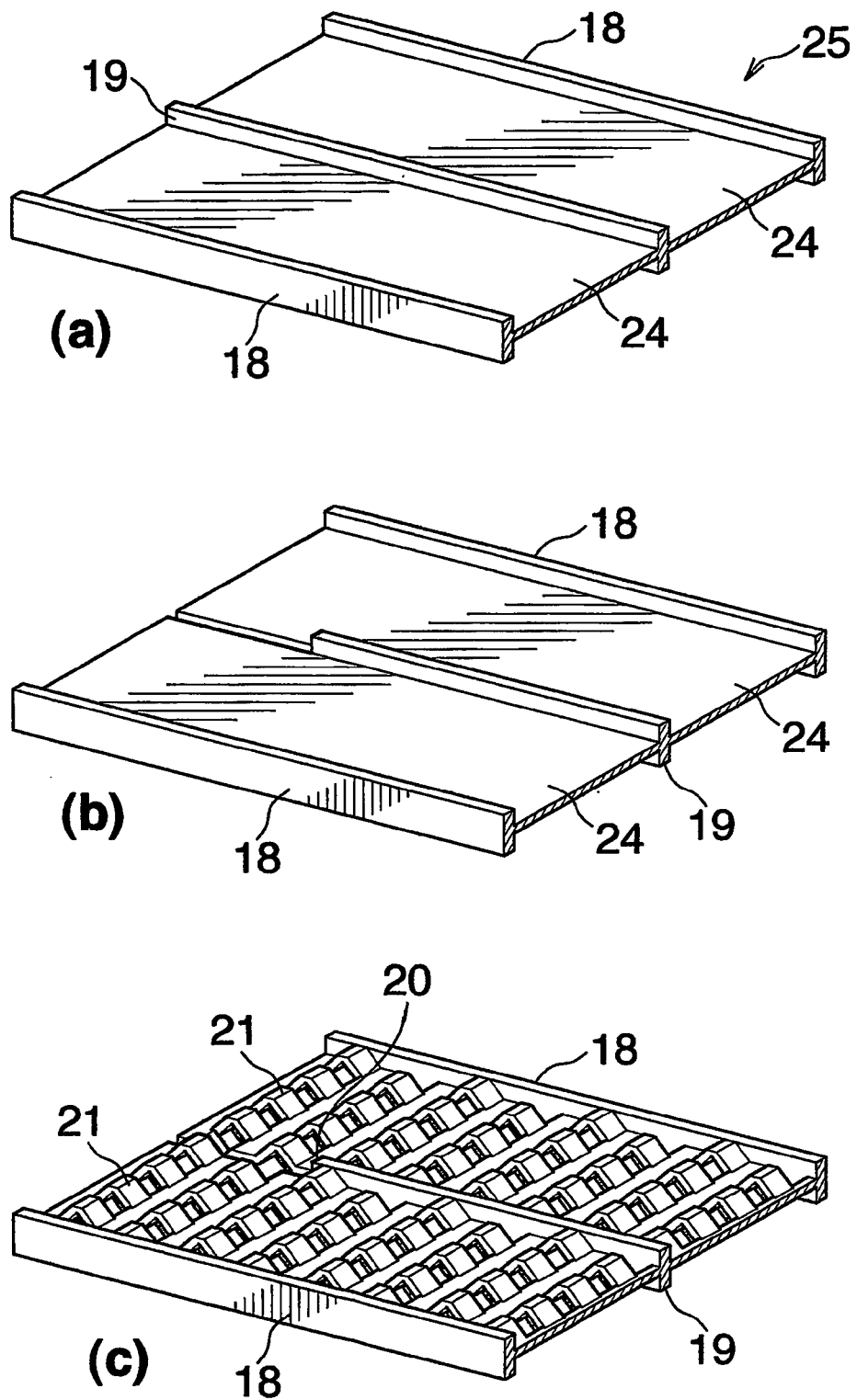
FIG. 9 includes fragmentary perspective views of a left end portion of the channel forming body to show the process for fabricating the body.
Figure 10:
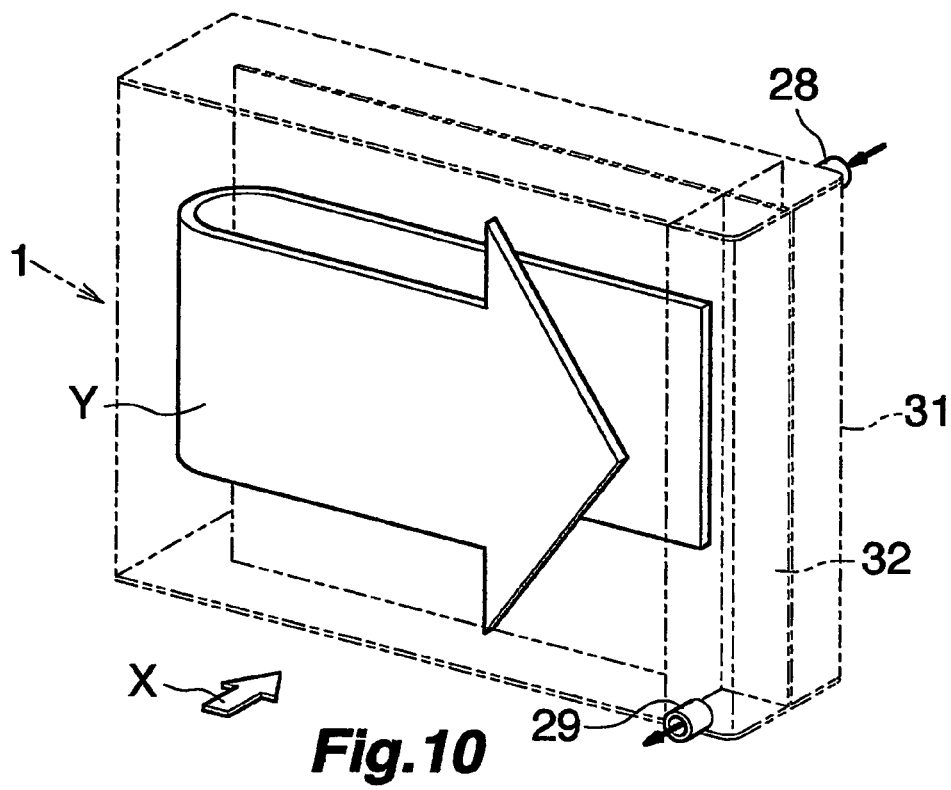
FIG. 10 is a diagram showing a flow of oil in the oil cooler of FIG. 1.

FIG. 1 shows the overall construction of a heat exchanger wherein fluid passing flat hollow bodies of the invention are used, and FIGS. 2 to 7 shows the constructions of essential portions of the exchanger. FIGS. 8 and 9 further show a process for fabricating a channel forming body of the flat hollow body, and FIG. 10 shows a flow of high-temperature fluid in the heat exchanger shown in FIG. 1. Throughout the drawings, like parts are designated by like reference numerals.

The present embodiment is a heat exchanger adapted for use as the oil cooler of a compressor. Examples of such compressors are load compressors, compressors for use in gas turbines, compressors useful for brakes for railroad vehicles, etc.

FIG. 1 shows an oil cooler 1, which comprises flat hollow bodies 2 of aluminum extending laterally and arranged one above another in parallel at a spacing for passing therethrough a high-temperature oil, a spacer 3 of aluminum extrudate disposed between right end portions of each pair of vertically adjacent flat hollow bodies 2 and brazed to the flat hollow bodies, a spacer bar 4 of aluminum extrudate extending forward or rearward, disposed between left end portions of each pair of vertically adjacent flat hollow bodies 2 and brazed to the flat hollow bodies, and an corrugated aluminum fin 6 provided in an air passing clearance 5 between each pair of adjacent flat hollow bodies 2, positioned between the spacer 3 and the spacer bar 4 and brazed to the hollow bodies 2.

Arranged above the flat hollow body 2 at the upper end of the oil cooler 1 and below the flat hollow body 2 at the lower end thereof and spaced apart from these hollow bodies are respective aluminum side plates 7 having the same shape and size as the flat hollow body 2 when seen from above. A spacer 3 of aluminum extrudate is provided also between the right end of each of the flat hollow bodies 2 at the upper and lower ends and the right end of the side plate 7 adjacent to the hollow body and is brazed to the hollow body 2 and the side plate 7. A spacer bar 4 of aluminum extrudate is provided also between the left end of each of the flat hollow bodies 2 at the upper and lower ends and the left end of the side plate 7 adjacent to the hollow body and is brazed to the hollow body 2 and the side plate 7. An air passing clearance 5 is formed also between each of the flat hollow bodies 2 at the upper and lower ends and the side plate 7 adjacent thereto, and a corrugated aluminum fin 5 is provided also in the clearance 5 and brazed to the hollow body 2 and the side plate 7. The side plate 7 comprises an aluminum brazing sheet having a brazing material layer over one surface thereof having the spacer 3, spacer bar 4 and corrugated fin 6 brazed thereto.

Figure 2:
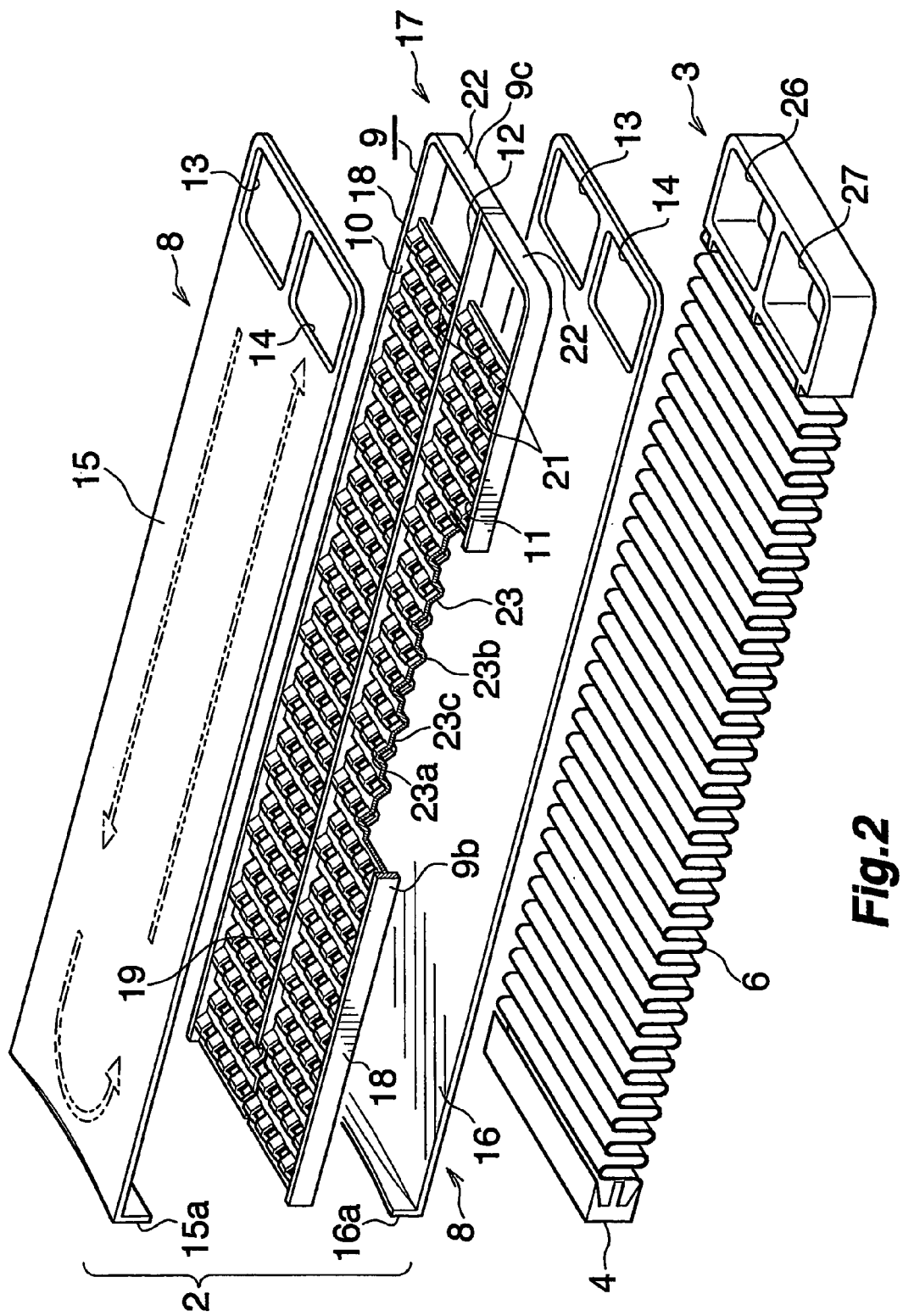
FIG. 2 is an exploded perspective view showing a portion of the oil cooler of FIG. 1.
Figure 3:
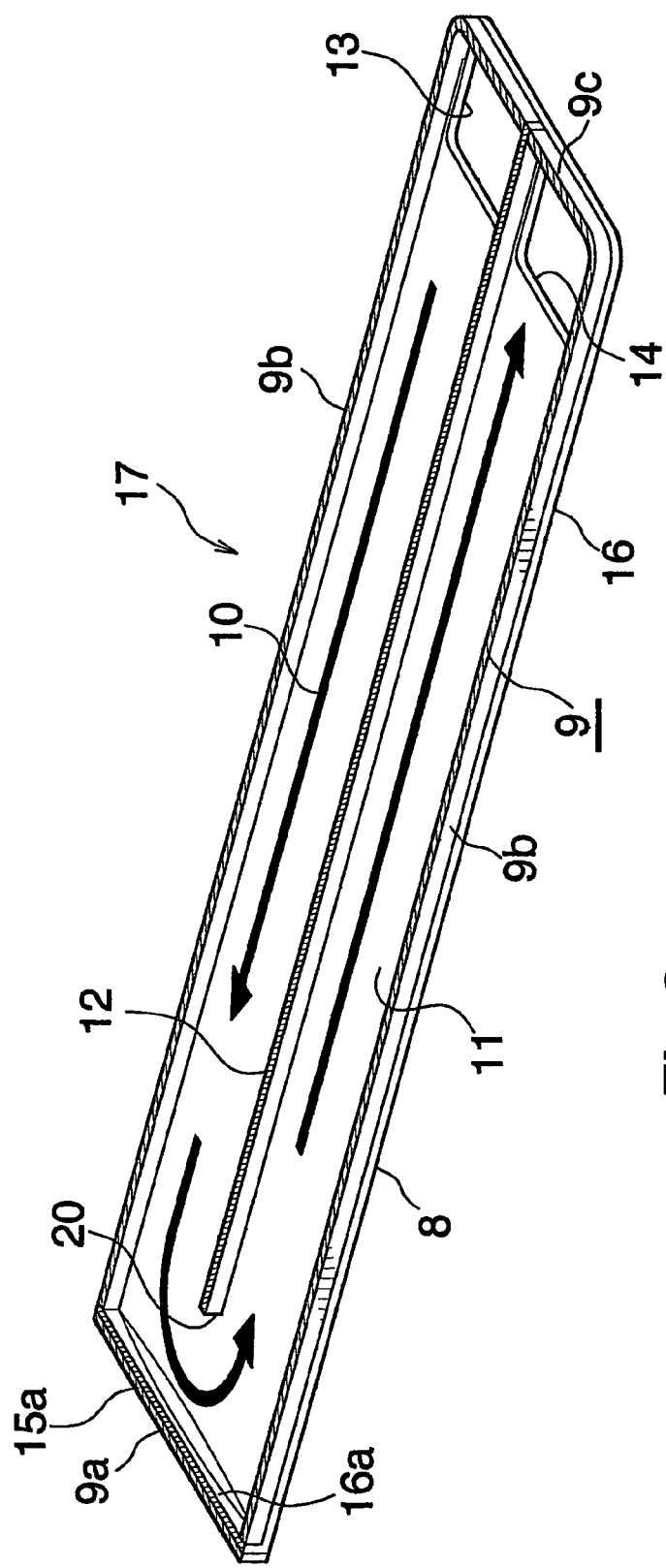
FIG. 3 is a perspective view partly broken away and showing the fluid passing flat hollow body of the oil cooler of FIG. 1 with heat transfer area increasing portions omitted.

With reference to FIGS. 2 and 3, the flat hollow body 2 comprises an upper and a lower flat plate 8 elongated laterally, a peripheral wall 9 interconnecting the peripheral edges of the upper and lower walls 8, and a partition wall 12 dividing the interior of the wall 9 into front and rear two channels 10, 11 extending laterally. Each of the upper and lower walls 8 has two holes 13, 14 formed in a right end portion thereof respectively on the front and rear opposite sides of the partition wall 12 and spaced apart transversely of the wall 8 for causing the respective channels 10, 11 to communicate with the outside therethrough. A left end portion of the partition wall 12 is cut out to hold the two channels 10, 11 in communication with each other as indicated at 20. The flat hollow body 2 comprises two rectangular flat plates 15, 16 elongated laterally and arranged one above the other at a spacing and each made of an aluminum brazing sheet having a brazing material layer over opposite surfaces thereof, and a channel forming body 17 of aluminum extrudate and disposed between and brazed to the upper and lower flat plates 15, 16.

Each of the flat plates 15, 16 has holes 13, 14 formed in respective front and rear side parts of a right end portion thereof. A left end portion of each of the flat plates 15, 16 is bent toward a left end portion of the other, that is, the upper flat plate 15 is bent downward, and the lower flat plate 16 is bent upward, and these bent portions 15a, 16a are lapped over and brazed to each other (see FIGS. 4 to 6). The two flat plates 15, 16 provide the upper and lower walls 8, and the bent portions 15a, 16a of the flat plates 15, 16 provide a left wall portion 9a.

Figure 7:
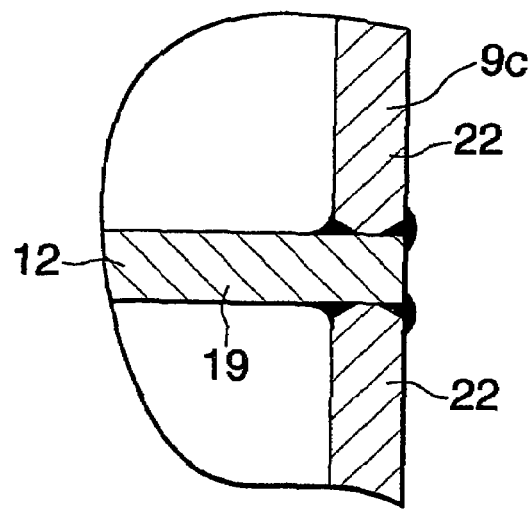
FIG. 7 is a view in horizontal section and showing a portion of a channel forming body of the flat hollow body on an enlarged scale.

The channel forming body 17 comprises two straight side bars 18 extending laterally and arranged between the upper and lower flat plates 15, 16 respectively at the front and rear opposite side edges thereof, an intermediate bar 19 extending laterally and disposed between and spaced apart from the two side bars 18, two heat transfer area increasing portions 21 each interconnecting the intermediate bar 19 and each of the side bars 18 integrally therewith and positioned at an intermediate portion of the height of the bars, and end bars 22 extending forwardly or rearwardly inward from the right ends of the respective side bars 18 integrally therewith and having respective inner ends butting on and brazed to the front and rear opposite side faces of the right end of the intermediate bar 19 (see FIG. 7). The two side bars 18, intermediate bar 19 and end bars 22 are brazed to the upper and lower flat plates 15, 16. The intermediate bar 19 has a right end portion brazed to each of the flat plates 15, 16 at the portion thereof between the holes 13, 14. The intermediate bar 19 has a left end portion cut out therefrom over a predetermined length so as to provide the communication portion 20. Each of the heat transfer area increasing portions 21 has a right end portion cut out therefrom over a predetermined length so as to form a hole matching with the holes 13 or 14 of the flat plates 15, 16. The side bars 18 of the channel forming body 17 provide the front and rear opposite side wall portions 9b of the peripheral wall 9, and the end bars 22 of the body 17 provide the right wall portion 9c of the peripheral wall 9.

The heat transfer area increasing portion 21 comprises a plurality of wavy strips 23 each including upwardly projecting bent parts 23a and downwardly projecting bent parts 23b alternately arranged laterally and horizontal parts 23c interconnecting these parts 23a, 23b, the wavy strips 23 being arranged in parallel transversely of the channel forming body 17 and connected to one another by the horizontal parts 23c. With the strips 23 of the increasing portion 21, the pair of upward bent parts 23a which are adjacent transversely of the body 17, as well as the pair of downward bent parts 23b which are similarly adjacent, are positioned as shifted from each other laterally. In the increasing portion 21, there is the horizontal part 23c between the pair of upward bent part 23a and the downward bent part 23b of each wavy strip 23 which are laterally adjacent, and the pair of strips 23 which are adjacent in the transverse direction are connected to each other by horizontal parts 23c, whereas the horizontal parts 23c need not always be provided. In this case, the portion where the upward bent part 23a extends into the downward bent part 23b in one of adjacent strips 23 intersects like portion of the other strip 23, so that the adjacent strips 23 are joined into an integral piece at such portions.

The channel forming body 17 is fabricated in the manner shown in FIGS. 8 and 9. For preparing the channel forming body, a blank of aluminum extrudate is produced which comprises two straight side bars 18 extending laterally and spaced apart transversely of the blank, an intermediate bar 19 extending laterally and disposed between and spaced apart from the two side bars 18, and two flat plate portions 21 each interconnecting the intermediate bar 19 and each of the side bars 18 integrally therewith and positioned at an intermediate portion of the height of the bars [see FIGS. 8(a) and 9(a)]. The intermediate bar 19 is then cut out at left and right opposite end portions thereof over a predetermined length, and a right end portion of each of the flat plate portions 24 is cut out over a length greater than the length of the cutout of the right end portion of the bar 19 [see FIGS. 8(b) and 9(b)]. Subsequently, each flat plate portion 24 is subjected to press work to form a heat transfer area increasing portion 21 [see FIGS. 8(c) and 9(c)]. The right end portions of the side bars 18 are thereafter bent forwardly or rearwardly inward to cause the outer ends thereof to butt on the front and rear opposite side faces of the right end of the intermediate bar 19 [see FIG. 8(d)], and the outer ends of the bar 19 are brazed to the bar 19 to form two end bars 22. Incidentally, the outer ends of the end bars 22 are brazed to the intermediate bar 19 with a molten brazing material melted from the flat plates 15, 16 when the heat exchanger 1 to be described later is fabricated.

Figure 4:
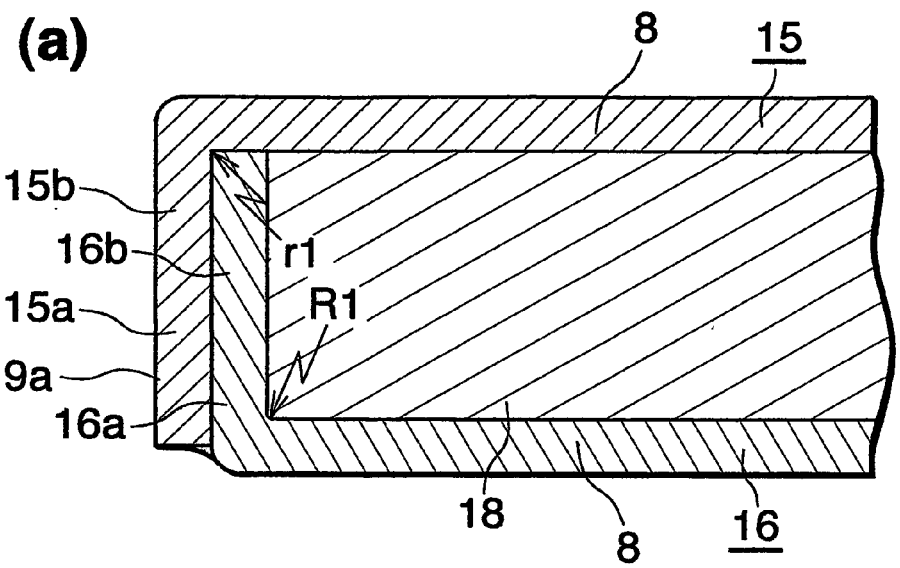
FIG. 4 includes views in vertical section and showing left end portions of the flat hollow body of the same on an enlarged scale.
Figure 4:
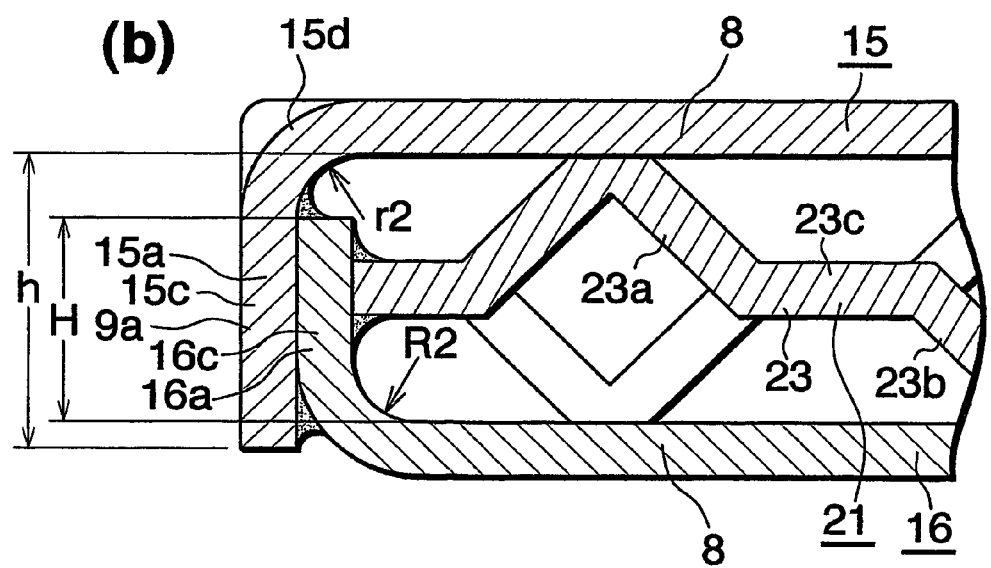
Figure 5:
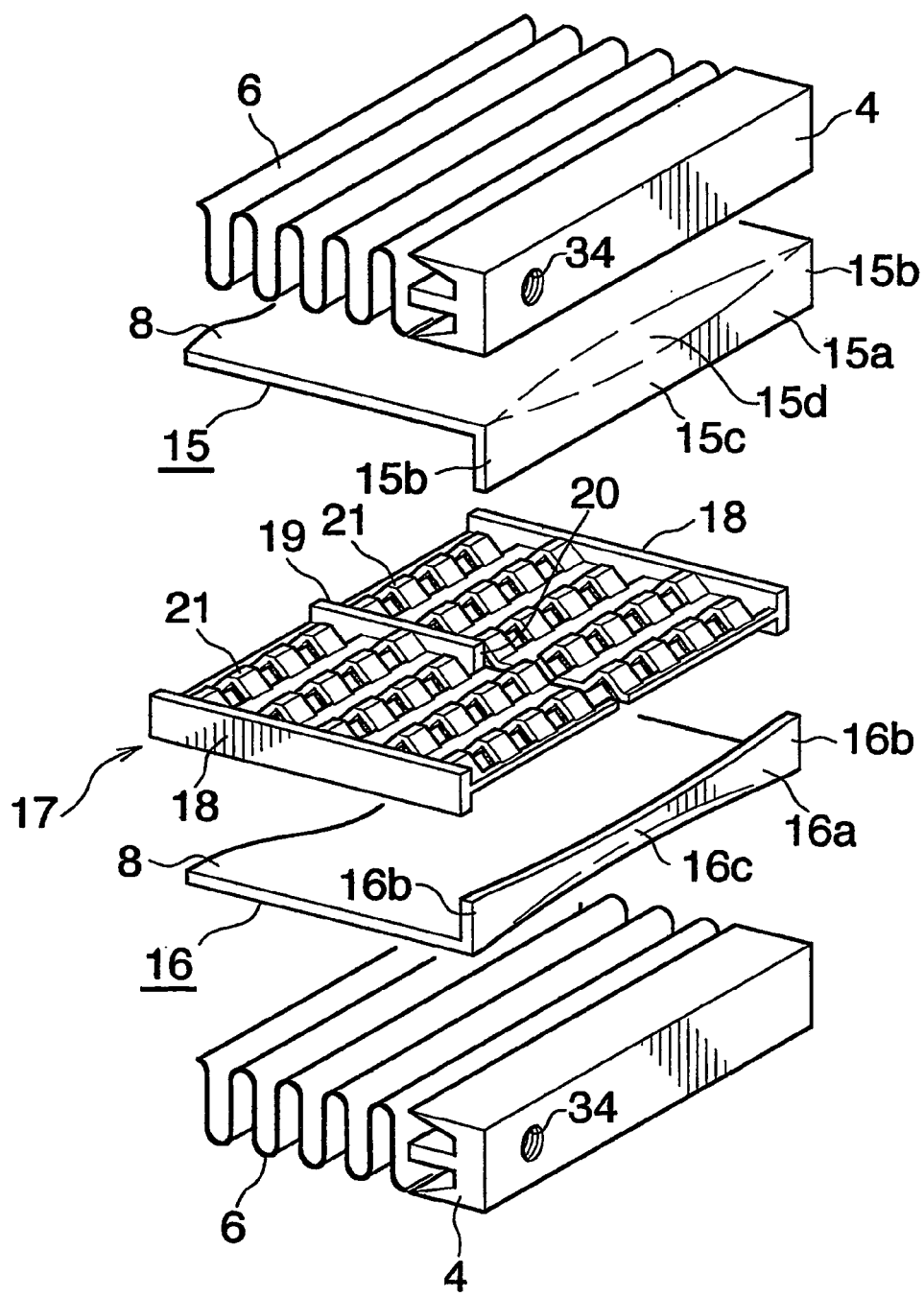
FIG. 5 is a fragmentary exploded perspective view showing the flat hollow body of the oil cooler of FIG. 1, spacer bars at opposite sides thereof and left end portions of fins.

With reference to FIG. 4, one of the bent portions 15a, 16a of the upper and lower flat plates 15, 16 which is positioned inside, i.e., the bent portion 16a of the lower flat plate 16, has a part 16b positioned at each of the front and rear ends thereof, corresponding to the side bar 18 of the channel forming body 17 and having a radius R1 of curvature on the inner side thereof. The radius R1 of curvature permits no clearance to be created between the side bar corresponding part 16b and the side bar 18. For example, the radius R1 is up to 0.2 mm. The other bent portion which is positioned outside, i.e., the bent portion 15a of the upper flat plate 15, has a part 15b positioned at each of the front and rear ends thereof, corresponding to the side bar 18 of the channel forming body 17 and having a radius r1 of curvature on the inner side thereof. The radius r1 of curvature permits no clearance to be created between the side bar corresponding parts 15b, 16b. For example, the radius r1 is up to 0.2 mm. The parts 15c, 16c of the bent portions 15a, 16a of the upper and lower flat plates 15, 16 other than the side bar corresponding parts 15b, 16b have on the inner side thereof a radius r2 or R2 of curvature greater than the radius r1 or R1 of curvature of the side bar corresponding parts 15b, 16b on the inner side thereof and not smaller than the thickness of the upper and lower flat plates 15, 16. One of the bent portions 15a, 16a of the upper and lower flat plates 15, 16 which is positioned inside, i.e., the bent portion 16a of the lower flat plate 16, has at the part 16c thereof other than the side bar corresponding parts 16b a height H smaller than the height h of a part of the bent portion positioned outside, i.e., of the part 15c of the bent portion 15a of the upper flat plate 15 other than the side bar corresponding parts 15b thereof, the height H being such that the part 16c will not interfere with the curved part 15d of the bent portion 15a of the upper flat plate 15. According to the present embodiment, the bent portion 16a of the lower flat plate 16 is positioned inside, with the bent portion 15a of the upper flat plate 15 positioned outside, whereas the bent portion 15a of the upper flat plate 15 may conversely be positioned inwardly of the bent portion 16a of the lower flat plate 16. In this case, the bent portion 15a and the bent portion 16a are in opposite relationship to the above with respect to the dimensions.

With reference to FIG. 2, the spacer 3 has vertical through holes 26, 27 communicating with the respective two holes 13, 14 of the upper and lower walls 8 of the flat hollow body 2 and in register with the respective holes 13, 14 when seen from above. The spacer 3 disposed between the flat hollow body 2 at each of the upper and lower ends of the oil cooler 1 and the side plate 7 adjacent thereto has the end openings of its through holes 16, 17 closed with the side plate 7.

An oil inlet pipe 28 of aluminum is joined by brazing to the front wall of the spacer 3 which is disposed between the flat hollow body 2 at the upper end and the top side plate 7 so as to communicate with the interior of the front through hole 26 of the spacer. An oil outlet pipe 29 of aluminum is joined by brazing to the rear wall of the spacer 3 which is disposed between the flat hollow body 2 at the lower end and the bottom side plate 7 so as to communicate with the interior of the rear through hole 27 of the spacer. Thus, the oil inlet pipe 28 (fluid inlet) is provided at a front upper end portion of the oil cooler 1 so as to communicate with the front channels 10 of all the flat hollow bodies 2, and the front through holes 26 of all the spacers 3, and the oil outlet pipe 29 (fluid outlet) is provided at a rear lower end portion of the oil cooler 1 so as to communicate with the rear channels 11 of all the flat hollow bodies 2 and the rear through holes 27 of all the spacers 3. An inlet-side header 31 is provided by the front parts of right end portions of all the flat hollow bodies 2 and the front portions of all the spacers 3, and the inlet-side header 31 causes right ends of the front channels 10 of all the flat hollow bodies 2 to communicate with the front through holes 26 of all the spacers 3 through the front holes 13 of the upper and lower walls 8. An outlet-side header 32 is provided by the rear parts of right end portions of all the flat hollow bodies 2 and the rear portions of all the spacers 3, and the outlet-side header 32 causes right ends of the rear channels 11 of all the flat hollow bodies 2 to communicate with the rear through holes 27 of all the spacers 3 through the rear holes 14 of the upper and lower walls 8.

Figure 6:
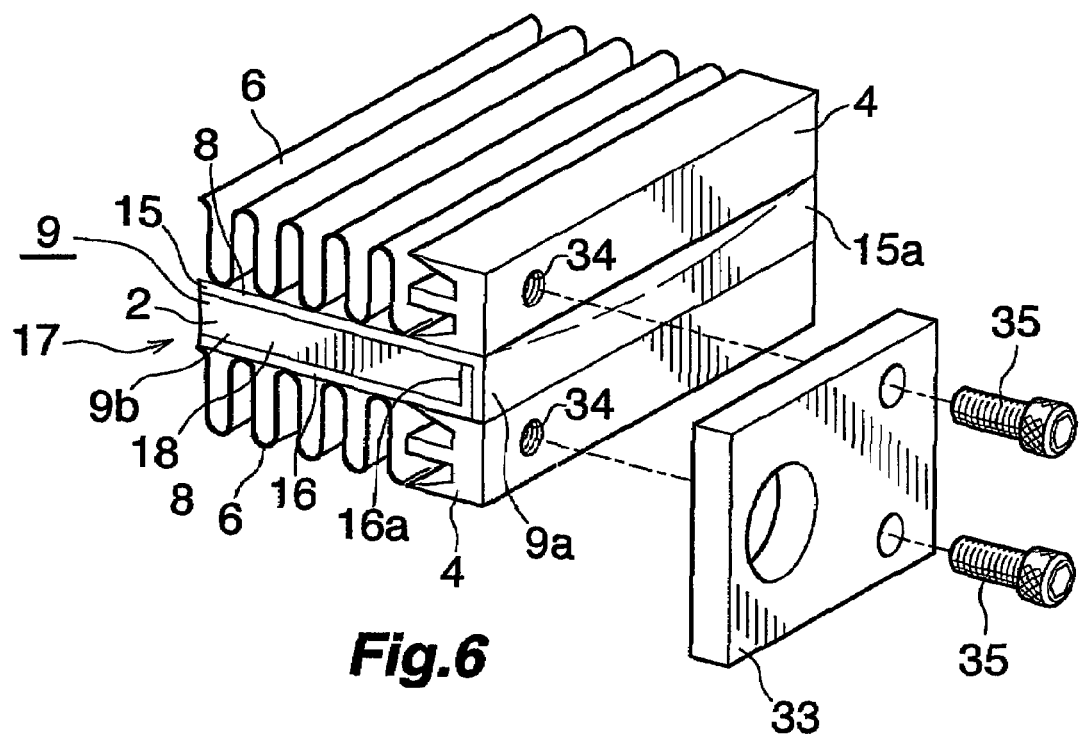
FIG. 6 is a fragmentary perspective view showing the same portions as FIG. 5.

With reference to FIGS. 6 and 7, two adjacent spacer bars 4 included in the spacer bars 4 are provided in each of the left side walls thereof with one screw bore 34 for use in attaching a bracket 33 or boss to both the spacer bars 4 with screws 35.

The oil cooler 1 is fabricated by arranging flat plates 15, 16 made of aluminum brazing sheet, channel forming bodies 17 of aluminum extrudates, spacers 3, spacer bars 4, corrugated fins 6 and side plates 7 of aluminum brazing sheet in a specified order in superposed layers, fitting an oil inlet pipe 28 and an oil outlet pipe 29 to the assembly, tacking the resulting assembly by suitable means, and brazing the assembly collectively. Stated more specifically, the oil cooler 1 is fabricated by arranging a plurality of combinations one above another in parallel at a spacing, each of the combinations comprising an upper and a lower flat plate 15, 16 and a channel forming body 17 disposed between the flat plates, placing two side plates 7 respectively above the combination at the upper end and below the combination at the lower end, arranging a spacer 3, a spacer bar 4 and a corrugated fin 6 between each pair of adjacent combinations, as well as between the combination at each of the upper and lower ends and the side plate adjacent thereto, fitting an oil inlet pipe 28 and an oil outlet pipe 29 to the assembly, tacking the resulting assembly by suitable means, and collectively brazing the assembly. At this time, molten brazing material melting from the flat plates 15, 16 is used for brazing the flat plates 15, 16 to the channel forming bodies 17, spacers 3, spacer bars 4 and corrugated fins 6 and brazing the outer ends of the end bars 22 to the intermediate bars 19. Incidentally, the spacers 3 are arranged, with the two vertical through holes 26, 27 of each spacer in register with the respective two holes 13, 14 of each of the flat plates 15, 16. The oil inlet pipe 28 and the outlet pipe 29 may be joined to the corresponding spacers 3 separately by welding.

With the oil cooler 1 thus constructed, an oil of high temperature is admitted into the inlet-side header 31 through the oil inlet pipe 28, then dividedly flows into all the flat hollow bodies 2 to flow through the front channels 10 thereof leftward, further flows into the rear channels 11 through the communication portions 20, flows through the rear channels 11 rightward into the outlet-side header 32 and flows out of the oil outlet pipe 29 as indicated by an arrow Y in FIG. 10. While flowing through the front channels 10 and rear channels 11 of all the flat hollow bodies 2, the oil is subjected to heat exchange with air of low temperature flowing through the air passing clearances 5 in a direction indicated by an arrow X in FIG. 10 and thereby cooled. Stated more specifically, the oil of high temperature is cooled to some extent with the air while flowing through the front channels 10 of the flat hollow bodies 2 and is then admitted into the rear channels 11, and the air of low temperature is heated to some extent in the rear-side portions of the air passing clearances 5 and thereafter reaches the front-side portions of the clearances 5. Accordingly, even if the air reaching the front-side portions of the clearances 5 has a relatively high temperature, the oil flowing in the front channels 10 has a high temperature, differs greatly from the air in temperature and is therefore efficiently cooled. Even if the oil flowing in the rear channels 11 has its temperature reduced relatively greatly, the air in the front-side portions of the clearances 5 has a low temperature, differs greatly from the oil in temperature and therefore efficiently cools the oil. As a result, the oil cooler achieves a high heat exchange efficiency.

According to the foregoing embodiment, the heat exchanger of the invention is adapted for use as an oil cooler, whereas the heat exchanger is not limited to this use but may be used as an aftercooler or radiator for industrial machines such as load compressors, gas turbine compressors and compressors for railroad vehicles.

The heat exchanger of the invention is further useful as an oil cooler for hydraulic devices for cranes, deck cranes, crane trucks and power shovels, machine tools and like industrial machines.

Figure 11:
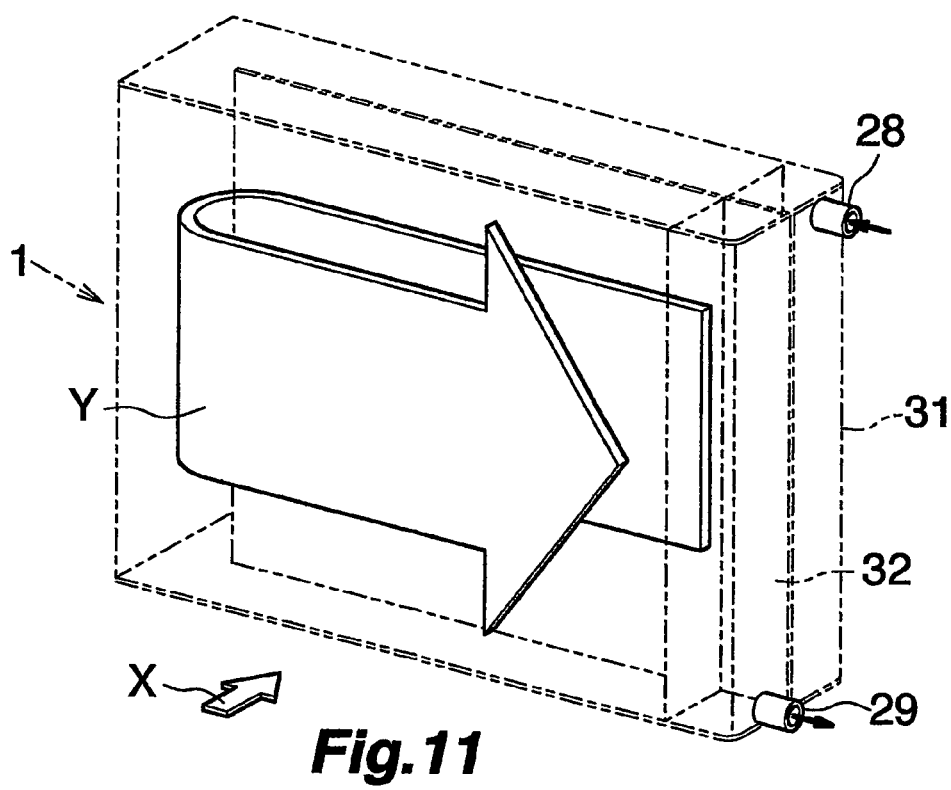
FIG. 11 is a diagram showing a flow of oil in another embodiment of oil cooler wherein fluid passing flat hollow bodies of the invention are used.
Figure 12:
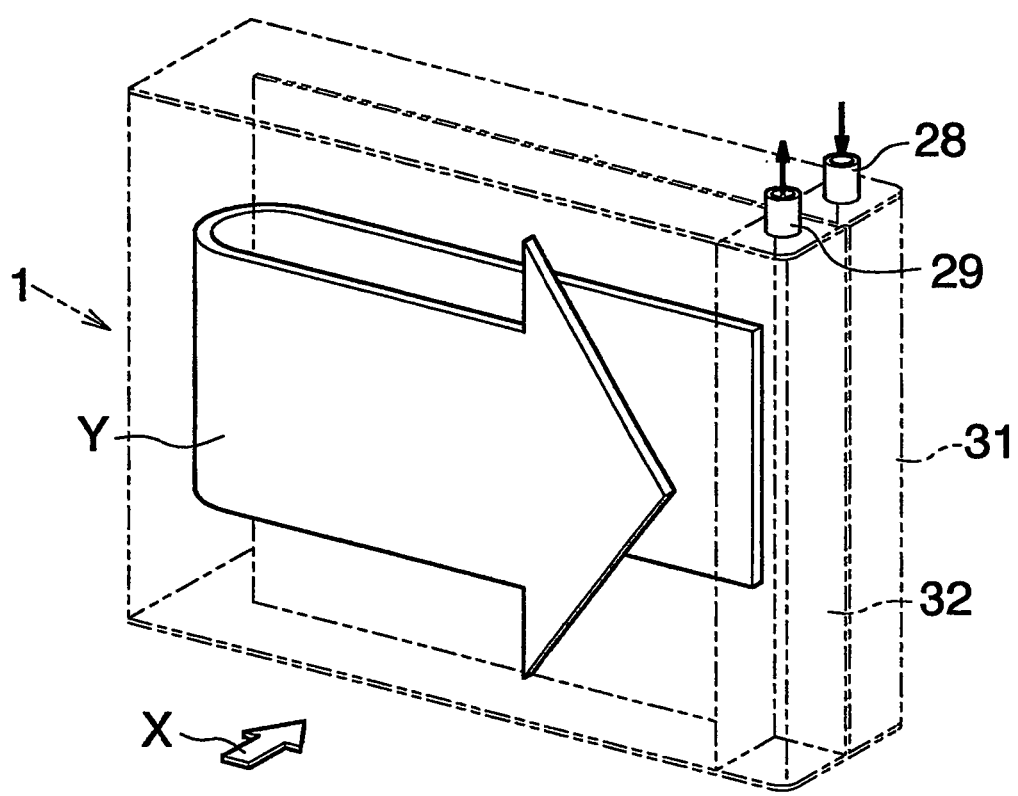
FIG. 12 is a diagram showing a flow of oil in another embodiment of oil cooler wherein fluid passing flat hollow bodies of the invention are used.

FIGS. 11 and 12 show other embodiments of oil coolers. In the case of the oil cooler 1 shown in FIG. 11, an oil inlet pipe 28 of aluminum is joined by brazing to a front portion of the right wall of the spacer 3 which is disposed between the flat hollow body 2 at the upper end and the top side plate 7 so as to communicate with the interior of the front through hole 26 of the spacer. An oil outlet pipe 29 of aluminum is joined by brazing to a rear portion of the right wall of the spacer 3 which is disposed between the flat hollow body 2 at the lower end and the bottom side plate 7 so as to communicate with the interior of the rear through hole 27 of the spacer. Thus, the oil inlet pipe 28 (fluid inlet) is provided at a front part of right wall upper end portion of the oil cooler 1 so as to communicate with the front channels 10 of all the flat hollow bodies 2 and the front through holes 26 of all the spacers 3, and the oil outlet pipe 29 (fluid outlet) is provided at a rear part of right wall lower end portion of the oil cooler 1 so as to communicate with the rear channels 11 of all the flat hollow bodies 2 and the rear through holes 27 of all the spacers 3.

In the case of the oil cooler 1 shown in FIG. 12, an oil inlet pipe 28 of aluminum is joined by brazing to a front portion of right end portion of the top side plate 7 so as to communicate with the interior of the front through hole 26 of the spacer 3 at the upper end, and an oil outlet pipe 29 of aluminum is joined by brazing to a rear portion of right end portion of the top side plate 7 so as to communicate with the interior of the rear through hole 27 of the spacer 3 at the upper end. Thus, the oil inlet pipe 28 (fluid inlet) is provided at a front part of top wall right end portion of the oil cooler 1 so as to communicate with the front channels 10 of all the flat hollow bodies 2 and the front through holes 26 of all the spacers 3, and the oil outlet pipe 29 (fluid outlet) is provided at a rear part of top wall right end portion of the oil cooler 1 so as to communicate with the rear channels 11 of all the flat hollow bodies 2 and the rear through holes 27 of all the spacers 3.

Incidentally, the oil flows through the oil coolers shown in FIGS. 11 and 12 in the same manner as illustrated in FIG. 10.

Figure 13:
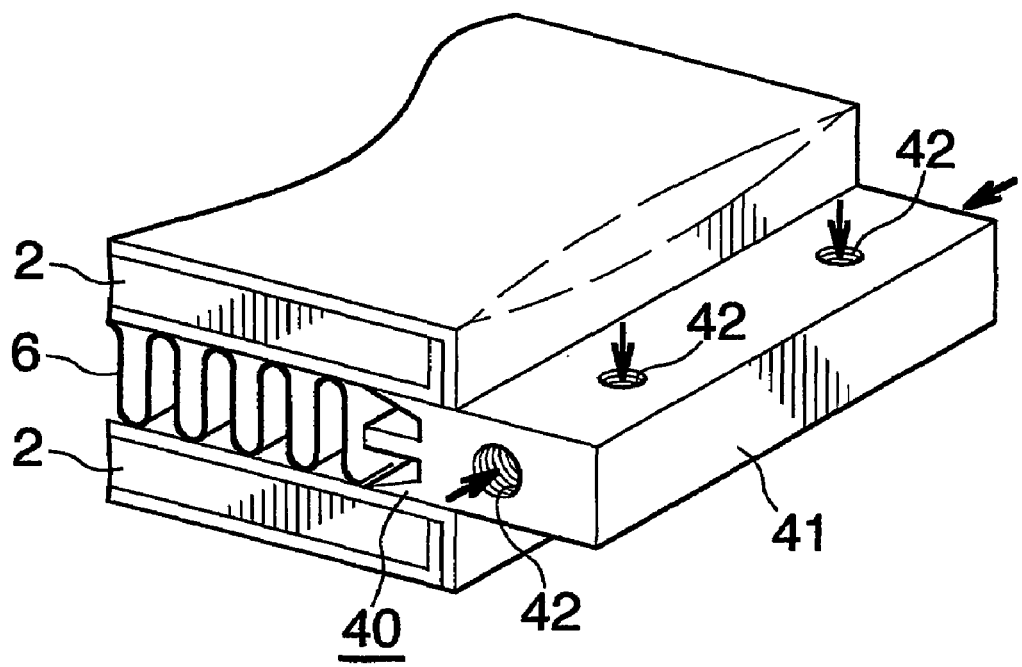
FIG. 13 is a diagram corresponding to FIG. 6 and showing a modification of the spacer bar, in which the bracket and the screws are not illustrated.
Figure 14:
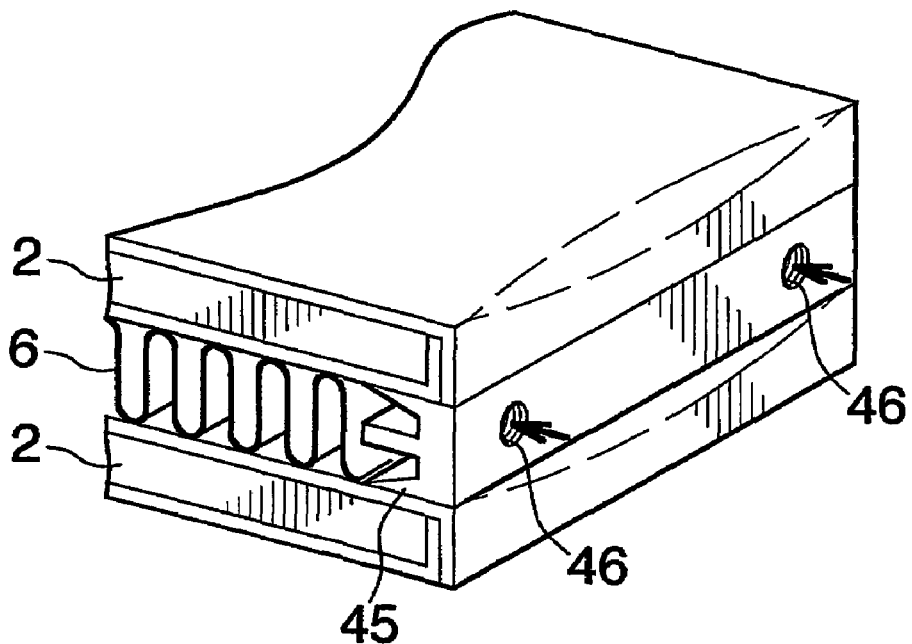
FIG. 14 is a diagram corresponding to FIG. 6 and showing another modification of the space bar, in which the bracket and the screws are not illustrated.

FIGS. 13 and 14 show modifications of spacer bar 4.

FIG. 13 shows a spacer bar 40 integrally provided with a ridge 41 extending over the entire length thereof and projecting outward beyond flat hollow bodies 2. Screw bores 42 for use in attaching a bracket or boss to the spacer bar are formed in the upper and lower faces of the ridge 41 and in opposite end faces thereof.

FIG. 14 shows a spacer bar 45 having two screw bores 46 formed in the wall thereof facing toward a direction opposite to the corrugated fin 6 for use in attaching a bracket or boss to the spacer bar.

INDUSTRIAL APPLICABILITY

The invention provides a fluid passing flat hollow body which is suitable for passing a fluid of high temperature through heat exchangers, such as oil cooler, aftercoolers and 1s radiators, for compressors, machine tools, hydraulic devices and like industrial machines.

The invention claimed is:

1. A fluid passing flat hollow body comprising:
an upper flat plate and a lower flat plate elongated laterally and spaced apart as positioned one above the other; and
a channel forming body interposed between and brazed to the upper and lower flat plates, the channel forming body comprising two straight side bars extending laterally and arranged between the upper and lower flat plates respectively at front and rear opposite side edges thereof, an intermediate bar extending laterally and disposed between and spaced apart from the two side bars, two heat transfer area increasing portions each interconnecting the intermediate bar and each of the side bars integrally therewith and positioned at an intermediate portion of the height of the bars, and plural end bars extending forwardly or rearwardly inward from right ends of the respective side bars integrally therewith and having respective inner ends butting on and brazed to front and rear opposite side faces of a right end of the intermediate bar,
wherein the intermediate bar has a left end portion cut out therefrom, the two heat transfer area increasing portions have respective right end portions cut out therefrom, each of the upper and lower flat plates has holes formed in a right end portion thereof respectively on front and rear opposite sides of the intermediate bar, the upper and lower flat plates provide upper and lower walls, respectively, a left end portion of each of the upper and lower flat plates is bent toward the other flat plate, with the bent portions lapped over and brazed to each other, to thereby provide a left wall portion of a peripheral wall, the side bars of the channel forming body providing respective front and rear opposite side wall portions of the peripheral wall, the end bars of the channel forming body providing a right wall portion of the peripheral wall, the peripheral wall interconnects peripheral edges of the upper and lower walls, the intermediate bar provides a partition wall dividing the interior of the peripheral wall into front and rear two channels extending laterally, each of the upper and lower walls has the two holes formed in the right end portion thereof respectively on front and rear opposite sides of the partition wall and spaced apart transversely of the upper or lower wall for causing the respective channels to communicate with the outside therethrough, and the left end portion of the partition wall is cut out to hold the two channels in communication with each other.

2. A fluid passing flat hollow body according to claim 1, wherein each of the upper and lower flat plates is made of an aluminum brazing sheet, and the channel forming body is made of an aluminum extrudate.

3. A fluid passing flat hollow body according to claim 1, wherein one of the left-end bent portions of the upper and lower flat plates which is positioned inside has a part corresponding to each of side bars of the channel forming body, the side bar corresponding part having on an inner side thereof a radius of curvature permitting no clearance to be created between the side bar corresponding part and the side bar, the other bent portion which is positioned outside having a part corresponding to each side bar of the channel forming body, the second-mentioned side bar corresponding part having on an inner side thereof a radius of curvature permitting no clearance to be created between the side bar corresponding parts of the inside and outside bent portions, and the part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof.

4. A fluid passing flat hollow body according to claim 3 wherein the side bar corresponding parts of the left-end bent portions of the upper and lower flat plates are up to 0.2 mm in radius of curvature on the inner side thereof, and the parts of the left-end bent portions of the upper and lower flat plates other than the side bar corresponding parts thereof have on the inner side thereof a radius of curvature not smaller than the thickness of the upper and lower flat plates.

5. A fluid passing flat hollow body according to claim 3 wherein the left-end bent portion of the upper or lower flat plate which bent portion is positioned inside has at the part thereof other than the side bar corresponding parts such a height that said part of the bent portion will not interfere with the curved part of the bent portion which is positioned outside.

6. A heat exchanger comprising fluid passing portions extending laterally and arranged one above another in parallel at a spacing, a spacer disposed between right ends of each pair of adjacent fluid passing portions and brazed to the pair of fluid passing portions, a spacer bar disposed between left ends of each pair of adjacent fluid passing portions and brazed to the pair of fluid passing portions, and a fin provided between and brazed to each pair of adjacent fluid passing portions and positioned between the spacer and the spacer bar, each of the fluid passing portions comprising a fluid passing flat hollow body according to claim 1, the spacer having two through holes communicating respectively with the two holes of each of the upper and lower walls of the flat hollow body.

7. A heat exchanger comprising fluid passing portions extending laterally and arranged one above another in parallel at a spacing, a spacer disposed between right ends of each pair of adjacent fluid passing portions and brazed to the pair of fluid passing portions, a spacer bar disposed between left ends of each pair of adjacent fluid passing portions and brazed to the pair of fluid passing portions, and a fin provided between and brazed to each pair of adjacent fluid passing portions and positioned between the spacer and the spacer bar, each of the fluid passing portions comprising a fluid passing flat hollow body according to any one of claims 3 to 6, the spacer having two through holes communicating respectively with the two holes of each of the upper and lower walls of the flat hollow body.

8. An industrial machine comprising a heat exchanger according to claim 6 and useful as an oil cooler.

9. An industrial machine comprising a heat exchanger according to claim 6 and useful as an aftercooler.

10. An industrial machine comprising a heat exchanger according to claim 7 and useful as an oil cooler.

11. An industrial machine comprising a heat exchanger according to claim 7 and useful as an aftercooler.

12. A process for fabricating a heat exchanger according to claim 7 which process is characterized by:
   preparing channel forming body blanks of aluminum extrudates each comprising two straight side bars extending laterally and spaced apart forwardly or rearwardly, an intermediate bar extending laterally and disposed between and spaced apart from the two side bars, and two flat plate portions each interconnecting the intermediate bar and each of the side bars integrally therewith and positioned at an intermediate portion of the height of the bars, pairs of upper and lower flat plates elongated laterally, spacers each having two through holes spaced apart forwardly or rearwardly, and spacer bars,
   making channel forming bodies each by cutting out left and right end portions of the intermediate bar of the blank, cutting out a right end portion of each of the flat plate portions of the blank over a length equal to the length of the cutout of the right end portion of the intermediate bar, subjecting each flat plate portion of the blank to press work to form a heat transfer area increasing portion, and bending right end portions of the side bars of the blank forwardly or rearwardly inward to cause outer ends thereof to butt on front and rear opposite side faces of the right end of the intermediate bar and to form end bars,
   bending the flat plates in each pair toward each other at left end portions thereof to form bent portions and forming two holes in a right end portion of each flat plate respectively on front and rear opposite sides of the intermediate bar,
   arranging a plurality of combinations one above another in parallel at a spacing, each of the combinations comprising the channel forming body interposed between the pair of upper and lower flat plates, providing the spacer between right end portions of each pair of adjacent combinations with the two through holes in communication with the respective two holes of each of the flat plates, providing the spacer bar between left end portions of each pair of adjacent combinations, and further providing a fin between each pair of adjacent combinations, as positioned between the spacer and the spacer bar, and
   brazing each pair of upper and lower flat plates to the side bars, the intermediate bar and the end bars of the channel forming body between the pair of flat plates, outer ends of the end bars to the intermediate bar, and the bent portions of the pair of flat plates to each other, and further brazing each pair of adjacent flat plates to the spacer, the spacer bar and the fin which are interposed therebetween.

13. A process for fabricating a heat exchanger according to claim 12 wherein the flat plates are made of an aluminum brazing sheet, the spacers, the spacer bars and channel forming body blanks are made of aluminum extrudates, the fin is made of a thin aluminum plate, and the brazing operation is conducted with a brazing material melting from the flat plates.

14. A process for fabricating a heat exchanger according to claim 12 wherein one of the left-end bent portions of the upper and lower flat plates which is positioned inside has a part corresponding to each of side bars of the channel forming body, the side bar corresponding part having on an inner side thereof a radius of curvature permitting no clearance to be created between the side bar corresponding part and the side bar, the other bent portion which is positioned outside having a part corresponding to each side bar of the channel forming body, the second-mentioned side bar corresponding part having on an inner side thereof a radius of curvature permitting no clearance to be created between the second-mentioned side bar corresponding part and the side bar, and the part of each of the left-end bent portions of the upper and lower flat plates other than the parts thereof corresponding to the side bars of the channel forming body has on an inner side thereof a radius of curvature greater than the radius of curvature of the side bar corresponding parts on the inner side thereof.

15. A process for fabricating a heat exchanger according to claim 14 wherein the side bar corresponding parts of the left-end bent portions of the upper and lower flat plates are up to 0.2 mm in radius of curvature on the inner side thereof, and the parts of the left-end bent portions of the upper and lower flat plates other than the side bar corresponding parts thereof have on the inner side thereof a radius of curvature not smaller than the thickness of the upper and lower flat plates.

16. A process for fabricating a heat exchanger according to claim 14 wherein the left-end bent portion of the upper or lower flat plate which bent portion is positioned inside has at the part thereof other than the side bar corresponding parts such a height that said part of the bent portion will not interfere with the curved part of the bent portion which is positioned outside.

17. A fluid passing flat hollow body comprising:
   an first flat plate and a second flat plate elongated laterally and spaced apart as positioned one above the other; and
   a channel forming body interposed between the first and second flat plates, the channel forming body comprising two side bars extending laterally and disposed between the first and second flat plates at opposite side edges of the first and second flat plates, an intermediate bar extending laterally and disposed between and spaced apart from the two side bars, two heat transfer area increasing portions interconnecting the intermediate bar and the side bars, and plural end bars connecting end portions of the side bars and intermediate bar at one end of the first and second flat plates,
   wherein the intermediate bar forms two channels extending laterally and has a cut out portion communicating the two channels with each other, the heat transfer area increasing portions have cut out portions, respectively, adjacent to the end bars, the first and second flat plates have holes formed adjacent to the end bars in opposite sides of the intermediate bar and for communicating the two channels with the outside, the side bars of the channel forming body provide side wall portions of a peripheral wall which connects peripheral edges of the first and second flat plates, the end bars of the channel forming body provide a first end wall portion of the peripheral wall, and the first and second flat plates have bent portions, respectively, lapping over to each other and providing a second end wall of the peripheral wall at an opposite end of the first end wall.

* * * * *